United States Patent [19]
Tawfik

[11] 3,890,575
[45] June 17, 1975

[54] WINDOW TRIP MONITOR AND COMPARATOR CIRCUIT

[75] Inventor: David A. Tawfik, Rego Park, N.Y.

[73] Assignee: The Bendix Corporation, Teterboro, N.J.

[22] Filed: July 17, 1969

[21] Appl. No.: 842,490

[52] U.S. Cl............ 328/146; 328/149; 307/235 R
[51] Int. Cl. ............................................. H03k 5/20
[58] Field of Search.............. 307/236, 235, 262; 328/146–148, 26, 149; 340/248 A, 172

[56] References Cited
UNITED STATES PATENTS

| | | | |
|---|---|---|---|
| 3,509,372 | 4/1970 | Bilking | 307/235 |
| 3,509,474 | 4/1970 | Arnold | 307/236 |
| 3,538,445 | 11/1970 | Brennen | 307/235 |

*Primary Examiner*—John Zazworsky
*Attorney, Agent, or Firm*—S. H. Hartz; Anthony F. Cuoco

[57] ABSTRACT

A window trip monitor circuit provides a warning indication when the absolute value of an input signal exceeds a trip level. An absolute value amplifier converts the input signal to a unipolar signal. A high gain level detector compares the unipolar signal with a reference signal and provides the warning indication when the unipolar signal exceeds the reference signal. The window trip monitor circuit may be used as a window trip comparator circuit by comparing two input signals and providing a difference signal to the absolute value amplifier.

14 Claims, 2 Drawing Figures

INVENTOR.
DAVID A. TAWFIK

BY *Peter C. Van Der Sluys*

AGENT

WINDOW TRIP MONITOR AND COMPARATOR CIRCUIT

BACKGROUND OF THE INVENTION

1. Field of the Invention

This invention relates to electrical circuits and more particularly to window trip circuits.

2. Description of the Prior Art

Window trip circuits are used to monitor signals of both positive and negative senses and such circuits as used heretofore required a level detector for monitoring signals of each sense. To provide identical trip levels in both senses it was necessary to perform precision adjustments on both level detectors.

Level detectors had a tendency to be unstable when the monitored signal was substantially equal to the trip level. Various types of delay and damping circuits were used to alleviate this problem; however, these circuits were relatively complex and were inconvenient to adjust. The same problems were encountered in comparator circuits where the difference signal could be of either sense.

SUMMARY OF THE INVENTION

The present invention contemplates a window trip circuit for receiving either a positive or negative input signal and for providing a warning indication when the absolute value of the input signal exceeds a trip level.

The window trip circuit has an absolute value amplifier which receives the input signal and provides a unipolar output signal having an amplitude corresponding to the amplitude of the input signal. The amplifier includes a resistive network for passing signals of positive sense to an output and an operational rectifier for inverting signals of negative sense and passing the inverted signals to the output.

A high gain level detector having an output signal of a first sense compares the unipolar output signal with a reference signal and the sense of the output signal changes to provide the warning indication when the unipolar signal exceeds the reference signal. Thus one level detector is used to detect both positive and negative signals that exceed a specified trip level.

The trip level is controlled by a single resistor which establishes the reference signal level. Thus the positive and negative trip levels of the window trip circuit are identical and are adjusted by changing the the resistance of a single resistor.

Hysteresis is provided by raising or lowering the trip level depending on the sense of the level detector output signal by feeding back a portion of the detector output signal through a resistor to the reference signal. The percentage of hysteresis or the shift in the trip level may be adjusted by changing the resistance of the feedback resistor.

One object of this invention is to provide a window trip circuit for monitoring or comparing signals of both positive and negative sense and having only one level detector.

Another object of the invention is to provide a window trip circuit having identical trip levels in both positive and negative senses which are controlled by a single resistor.

Another object of the invention is to provide a level detector having controllable hysteresis with identical percentages of hysteresis in both the positive and negative senses.

The foregoing and other objects and advantages of the invention will appear more fully hereinafter from a consideration of the detailed description which follows, taken together with the accompanying drawings wherein two embodiments of the invention are illustrated by way of exampled. It is to be expressly understood, however that the drawings are for illustration purposes only and are not to be construed as defining the limits of the invention.

DESCRIPTION OF THE INVENTION

Figure 1:
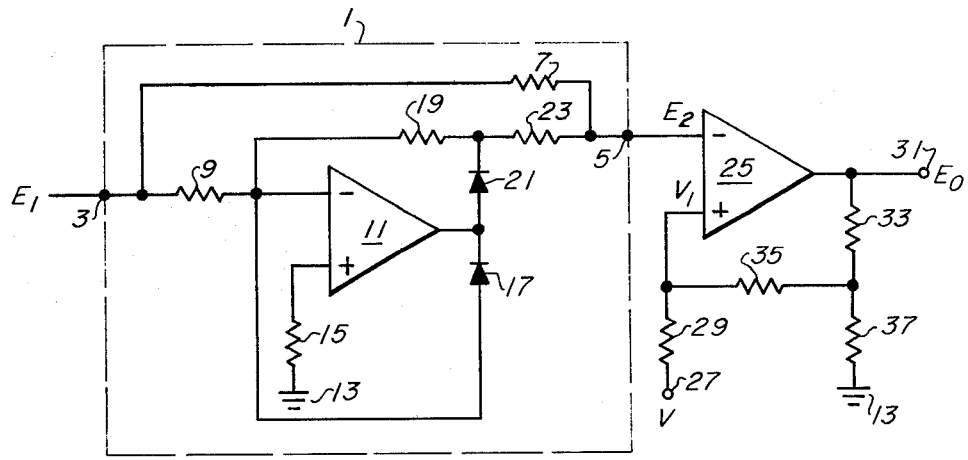
FIG. 1 is a schematic circuit diagram showing a window trip monitor circuit constructed in accordance with the present invention.

Referring to FIG. 1 there is shown a novel window trip circuit for monitoring a signal $E_1$ which goes both positive and negative and providing an output signal $E_0$ which changes sense when the absolute value of signal $E_1$ exceeds a trip level. Signal $E_0$ is at some predetermined positive level when signal $E_1$ is below the trip level. When signal $E_1$ exceeds the trip level, in either a positive or negative sense, signal $E_0$ goes to a predetermined negative level to provide a warning indication.

An absolute value amplifier 1 has an input 3 for receiving the signal $E_1$ and has an output 5 providing a positive unipolar output signal $E_2$ corresponding to the absolute value of signal $E_1$. A resistor 7 is connected between terminals 3 and 5 for passing a portion of the input signal to terminal 5. A resistor 9 connects terminal 3 to an inverting input of a high gain operational amplifier 11 having a noninverting input connected to ground 13 through a resistor 15. Amplifier 11 is arranged to function as an operational rectifier and has two degenerative feedback paths connected in parallel between an output and the inverting input. One path consists of a diode 17 having its cathode connected to the amplifier output and provides feedback when the input is of a positive sense. The other path comprises a series connection of a resistor 19 and a diode 21 having an anode connected to the amplifier output and provides feedback when the input is of a negative sense. A resistor 23 connects the junction of diode 21 and resistor 19 to terminal 5. Amplifier 11 receives signal $E_1$ through resistor 9 and provides an inverted signal at its output. For positive input signals amplifier 11 output is negative and degenerative feedback is provided through diode 17 making amplifier 11 gain essentially zero. Diode 21 blocks the negative output from appearing at terminal 5. For negative input signals feedback is provided through diode 21 and resistor 19 and the gain of amplifier 11 equals $R19/R_9$ where R9 and R19 correspond to the resistances of resistors 9 and 19 respectively. A portion of the positive output signal is provided to output terminal 5 through diode 21 and resistor 23. Terminal 5 is a summing point for the portion of the signal $E_1$ passed by resistor 7 and the portion of amplifier 11 output passed by resistor 23. The gain of amplifier 11 is adjusted so that signal $E_2$ is always unipolar and at a positive level corresponding to the level of signal $E_1$. It is essential that the gain of the absolute value amplifier 1 be equal for both positive and negative input signals.

For positive input signals the gain of absolute value amplifier 1 is determined by the attenuation of a series resistance network formed by resistors 7, 23, and 19 connected between terminal 3 and the inverting input of amplifier 11 which is at a zero signal level or a virtual ground. For positive inputs amplifier 11 is essentially out of the circuit because diode 21 is back biased isolating amplifier 11 output from terminal 5. Thus the gain of absolute value amplifier 1 for positive input signals is:

$$G_p = \frac{E_2}{E_1} = \frac{R19 + R23}{R7 + R19 + R23} \qquad (1)$$

Where R7, R19 and R23 correspond to the resistances of resistors 7, 19 and 23 respectively.

The gain of absolute value amplifier 1 when the input is negative depends on the gain of amplifier 11 and the attenuation of a resistance network formed by resistors 7 and 23. The output signal level from amplifier 11 is determined by resistors 9 and 19 and the portion of the output signal that appears at terminal 5 equals:

$$\frac{R7}{R7 + R23} \left( \frac{R19}{R9} \right) E_1 \qquad (2)$$

The portion of signal $E_1$ received at terminal 5 through resistor 7 equals:

$$\frac{R23}{R23 + R7} E_1 \qquad (3)$$

The portions of the signals are summed at terminal 5 providing signal $E_2$. The gain of absolute value amplifier 1 for negative input signals equals:

$$G_n = \frac{E_2}{E_1} = \frac{R19}{R9} \left( \frac{R7}{R7 + R23} \right) \frac{R23}{R7 + R23} \qquad (4)$$

Resistors 7, 9, 19 and 23 are selected to make the gains G in equations 1 and 4 equal thus amplifier 1 has equal gain for positive and negative inputs.

An operational amplifier 25 has an inverting input connected to terminal 5 and an output connected to a terminal 31. A d.c. signal V is applied to a terminal 27 which is connected through a resistor 29 to a noninverting input of amplifier 25 for applying a d.c. reference signal $V_1$ thereto. Terminal 31 is connected to the noninverting input of amplifier 25 through feedback resistors 33 and 35 connected in series. The junction of resistors 33 and 35 is connected to ground 13 by a resistor 37. When signal $E_2$ is less than reference signal $V_1$ amplifier 25 saturates in a positive sense and signal $E_0$ is at a positive level. When signal $E_2$ exceeds the level of signal $V_1$ the amplifier saturates negatively causing $E_0$ to be at a negative level.

For optimum operational accuracy it is desirable that signals $E_2$ and $V_1$ be derived from sources having the same impedance level. For positive $E_1$ signals the source impedance of signal $E_2$ is:

$$R_{pp} = \frac{R7 (R23 + R19)}{R7 + R19 + R23} \qquad (5)$$

For negative $E_1$ signals the source impedance of signal $E_2$ is:

$$R_{pn} = \frac{R7 \, R23}{R7 + R23} \qquad (6)$$

The average source impedance is:

$$R_{par} = \frac{R_{pp} + R_{pn}}{2} \qquad (7)$$

Resistor 33 is selected to have a much greater resistance than resistor 37 and resistors 29 and 35 are selected so that the sum of their resistances is much greater than the resistance of resistor 37. The source impedance of signal $V_1$ is made to equal the average source impedance of signal $E_2$ as follows:

$$R_{par} = \frac{R29 \, (R35 + R37)}{R29 + R35 + R37} \qquad (8)$$

Where R29, R35 and R37 correspond to the resistance of resistors 29, 35 and 37 respectively. Thus resistors 29, 35 and 37 have resistances selected in accordance with equation 8.

The circuit has a trip level that is determined as follows:

$$T.L. = V \frac{R35 + R37}{R29 + R35 + R37} \frac{1}{G} \qquad (9)$$

The trip level is easily adjusted over a wide range by variation of the resistance of resistor 29. This adjustment may present a slight impedance mismatch which can easily be tolerated by amplifier 25.

Resistors 33, 35 and 37 provide feedback of a portion of signal $E_0$ that either adds to or subtracts from reference signal $V_1$ depending on the sense of signal $E_0$. When signal $E_1$ is less than the trip level, signal $E_0$ is positive causing an incremental increase in the trip level, thus signal $E_1$ must actually exceed the trip level by the incremental amount before signal $E_0$ changes to a negative level. When signal $E_0$ changes negative the trip level is decreased by an incremental amount and signal $E_1$ must decrease by a corresponding amount before signal $E_0$ reverts back to a positive level. Thus the feedback of signal $E_0$ prevents instability of amplifier 25 when signal $E_1$ is substantially equal to the trip level. The incremental trip level shift provides hysteresis which is variable and may be controlled to any desired percentage of the trip level by variation of resistor 33. A percentage of hysteresis is determined by the following equation:

$$h = (2 \, |E_0| - 2) \left( \frac{R37}{R37 + R33} \right) \frac{100}{G \, (T.L.)} \qquad (10)$$

Figure 2:
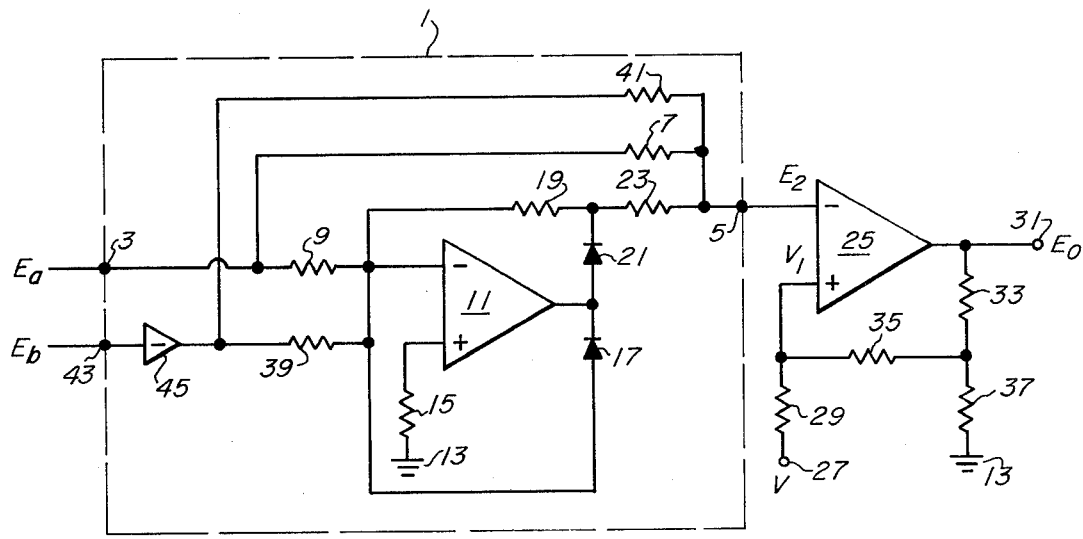
FIG. 2 is a schematic circuit diagram of a window trip comparator circuit.

Referring to FIG. 2 there is shown a window trip comparator circuit which is a modification of the circuit shown in FIG. 1. Corresponding numerals in FIGS. 1 and 2 represent corresponding components of the circuits. The circuit shown in FIG. 2 is the same as the circuit shown in FIG. 1 except that absolute value amplifier 1 also includes series connected resistors 39 and 41 in parallel with resistors 7 and 9 and an inverter 45. Resistor 41 is selected to have a resistance equal to the resistance of resistor 7 and resistor 39 is selected to have a resistance equal to the r sistance of resistor 9. Inverter 45 has an input connected to a terminal 43 for receiving an input signal $E_b$ and an output connected to the junction of resistors 39 and 41. Input terminal 3 receives a signal $E_a$ normally having the same sense as signal $E_b$. It is essential that the signals applied to the junction of resistors 7 and 9 and the junction of resistors 39 and 41 be of opposite sense. Therefore inverter 45 inverts signal $E_b$ so it is of opposite sense from signal $E_a$. If the signal $E_a$ and $E_b$ are normally of opposite sense then inverter 45 may be eliminated from the circuit.

Resistor pairs 7, 9 and 39, 41 sum the inverted $E_b$ signal and $E_a$ signal and provide difference signals to the inverting input of amplifier 11 and terminal 5 repectively. Absolute value amplifier 1 provides a unipolar signal $E_2$ at terminal 5 corresponding to the difference between the levels of signals $E_a$ and $E_b$. Signal $E_0$ is at a positive level and switches to a negative signal when the difference between the levels of signals $E_a$ and $E_b$ exceeds the trip level. The trip level and hysteresis are adjusted in the same manner as in the circuit shown in FIG. 1.

The gain of the absolute value amplifier must be equal for both positive and negative difference signals. The gain for positive signals is:

$$G_p = \frac{R23 + R19}{R7 + 2R23 + 2R19} \quad (11)$$

For negative signals the gain is:

$$G_n = \frac{R19}{R9}\left(\frac{R7}{2R23 + R7}\right) - \frac{R23}{2R23 + R7} \quad (12)$$

Resistors 7, 9, 19 and 23 are selected to have resistances that satisfy equations 11 and 12 and make the positive and negative gains equal. The average output impedance of the absolute value amplifier equals:

$$R_{pav} = \frac{\frac{R7(R23+R19)}{R7+2R23+2R19} + \frac{R7R23}{R7+2R23}}{2} \quad (13)$$

Resistors 29, 35 and 37 are selected to have resistances so that equation 8 equals equation 13 and the source impedances of signals $E_2$ and $V_1$ are equal.

The inverter 45 may be eliminated if signals $E_a$ and $E_b$ are normally of opposite sense.

The invention provides a simplified window trip circuit that may be used for monitoring a signal level or for comparing two signals and for providing a warning when a specified trip level is exceeded. The circuit has one level detector and adjustment of the trip levels for both positive and negative senses is accomplished by changing a single resistor. The trip levels are identical in both the positive and negative sense because only one level detector is used. The circuit has hysteresis that is controlled by adjustment of a single resistor and the hysteresis is identical in both the positive and negative senses.

What is claimed is:

1. A window trip circuit for monitoring a signal and providing a warning indication when the signal amplitude exceeds a trip level, comprising: an absolute value amplifier responsive to the signal for providing a unipolar output having an amplitude corresponding to the amplitude of the signal; means for providing a reference signal corresponding to the trip level; and a level detector for receiving the unipolar output and the reference signal and for providing the warning indication when the amplitude of the unipolar signal exceeds the amplitude of the reference signal.

2. A circuit as described in claim 1, in which the reference signal means includes means for varying the reference signal thereby varying the trip level.

3. A circuit as described in claim 1, in which the signal may be either an a.c. or d.c. signal.

4. A circuit as described in claim 1, in which the level detector provides an output at a first level when the amplitude of the unipolar signal is below the amplitude of the reference signal and at a second level when the amplitude of the unipolar signal exceeds the amplitude of the reference signal.

5. A circuit as described in claim 4, in which the level detector output reverses polarity when the unipolar signal exceeds the amplitude of the reference signal.

6. A circuit as described in claim 4, additionally comprising means for changing the reference signal in response to the output of the level detector.

7. A circuit as described in claim 4, additionally comprising means for providing hysteresis including feedback means for feeding back a portion of the level detector output to the reference signal so that the trip level changes in accordance with the level detector output.

8. A circuit as described in claim 7, in which the feedback means includes adjustable resistance means for changing hysteresis.

9. A circuit as described in claim 8, in which the hysteresis is adjusted by a single resistor in the feedback means.

10. A circuit as described in claim 2, in which the reference signal is adjusted by a single resistor.

11. A circuit as described in claim 1, in which the level detector comprises an operational amplifier.

12. A circuit as described in claim 1, in which the absolute value amplifier comprises: a resistance network for passing a portion of the signal; an operational rectifier responsive only to a first sense of the signal for providing an output having a second sense; and summing means connected to the resistance network and the operational rectifier for summing the signals therefrom and for providing a signal of the second sense having an amplitude corresponding to the amplitude of the signal.

13. A circuit of the type described in claim 1, adapted for comparing two signals of opposite sense, in which the absolute value amplifier includes summing means for receiving the two signals and for providing a signal corresponding to the difference between the absolute amplitudes of the signals, the absolute value amplifier being responsive thereto for providing the unipolar signal corresponding to the difference signal.

14. A circuit as described in claim 13, in which the signals are of the same sense and the absolute value amplifier additionally includes an inverter for receiving and inverting one of the signals.

\* \* \* \* \*